Feb. 2, 1937.　　　M. T. GOETZ ET AL　　　2,069,240
KEYBOARD PERFORATOR AND COUNTER
Filed June 3, 1932　　　7 Sheets-Sheet 1
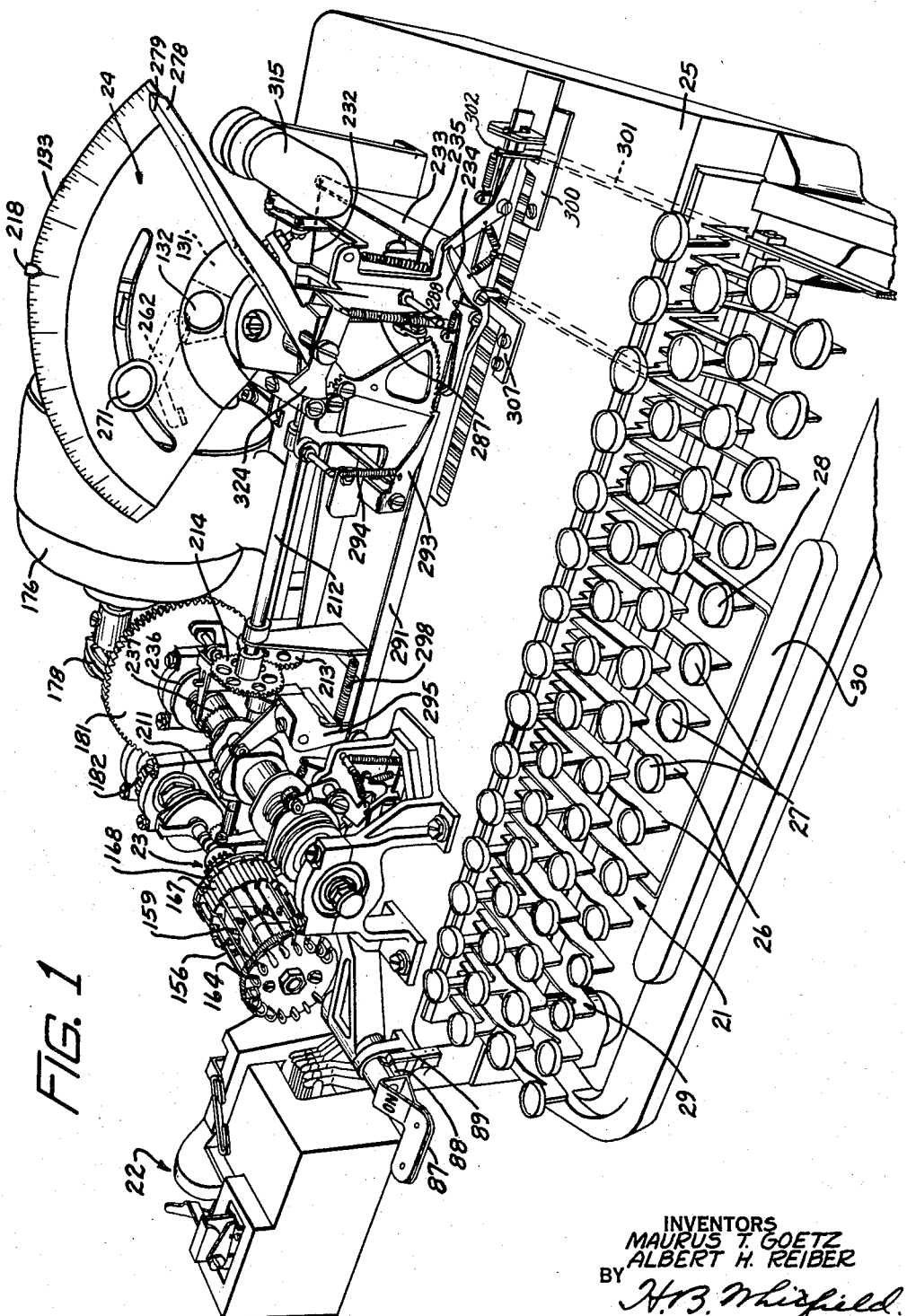
INVENTORS
MAURUS T. GOETZ
ALBERT H. REIBER
BY H. B. Whitfield
ATTORNEY

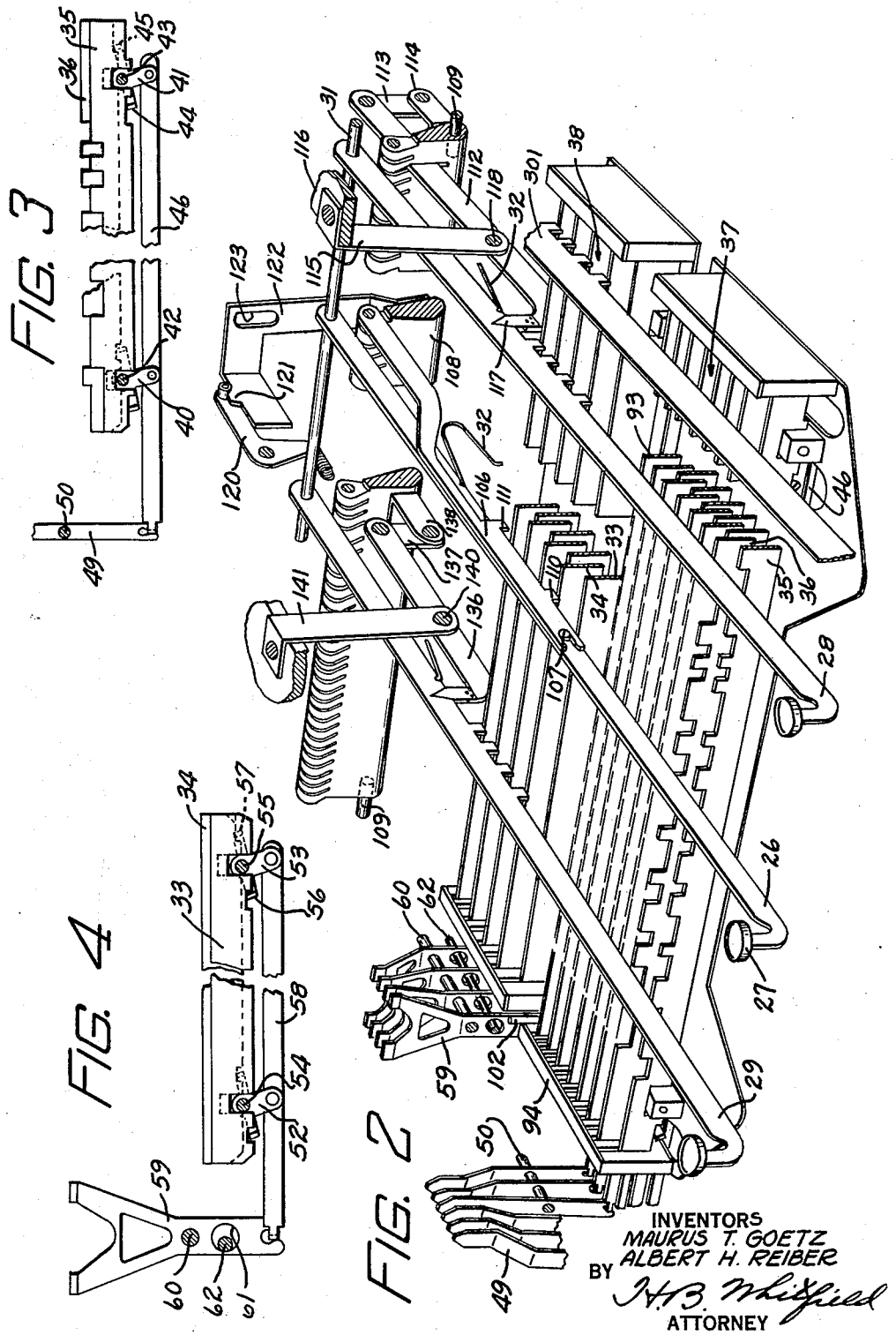

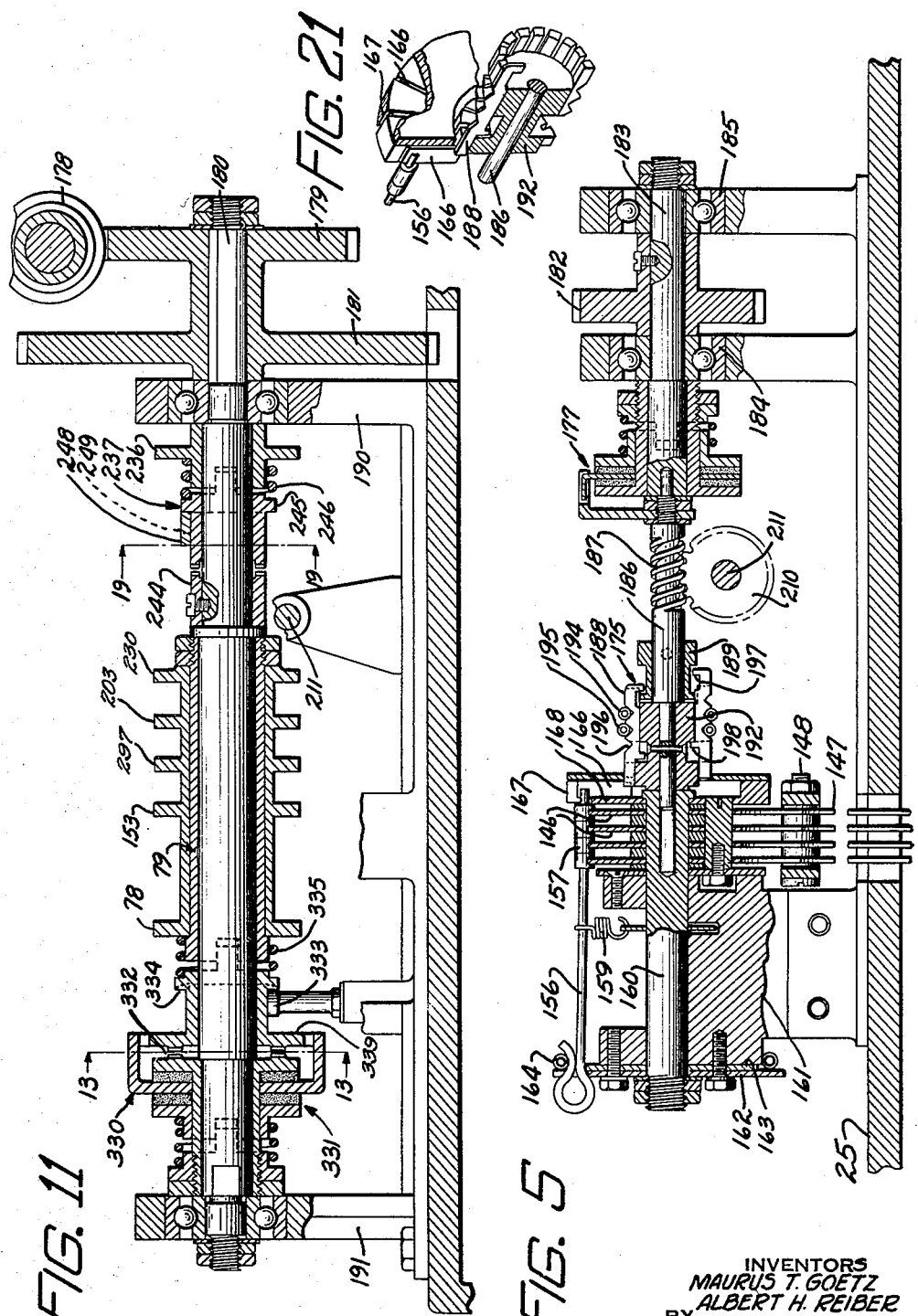

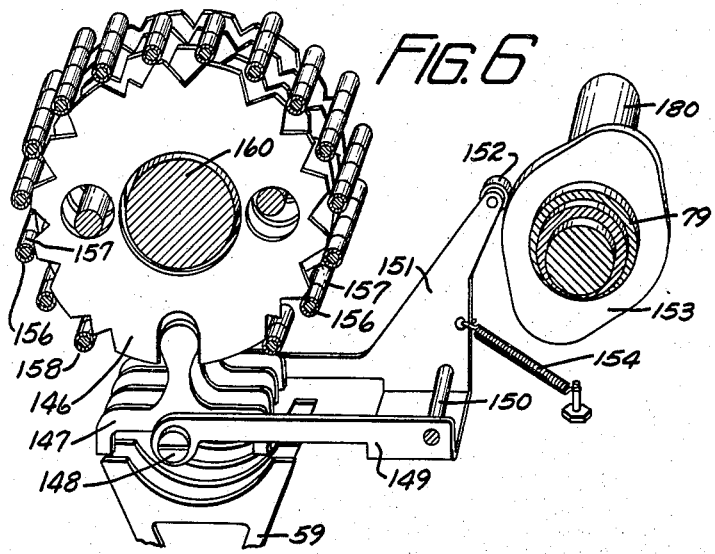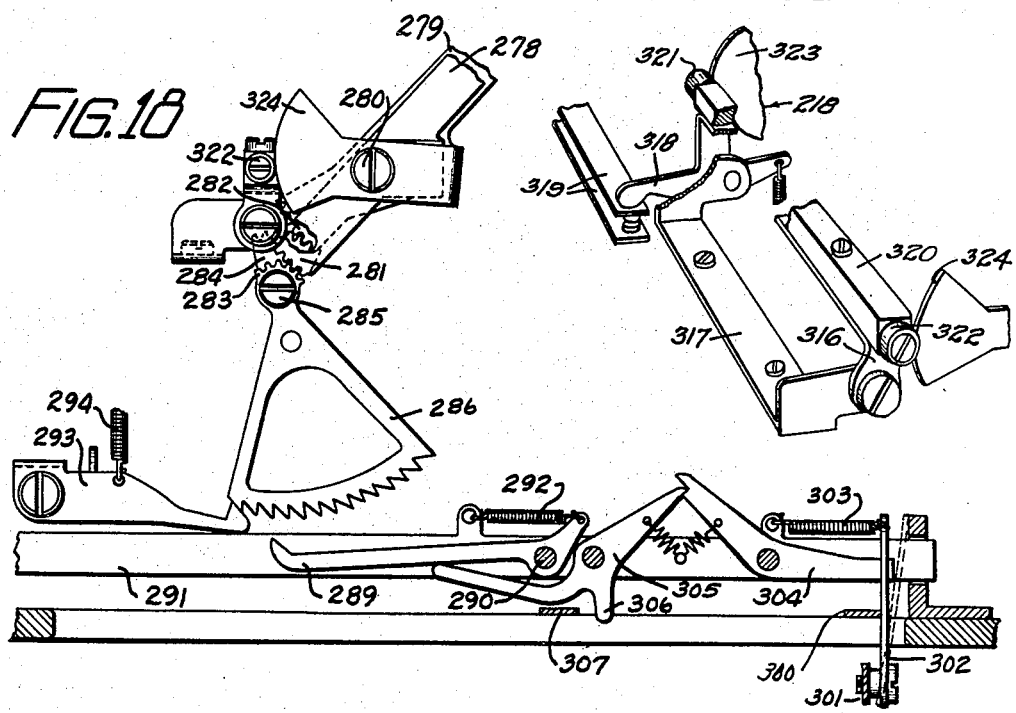

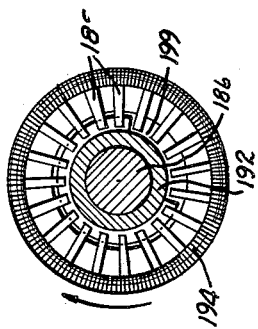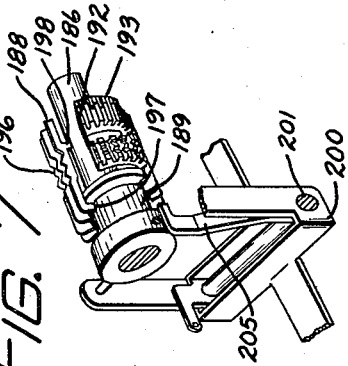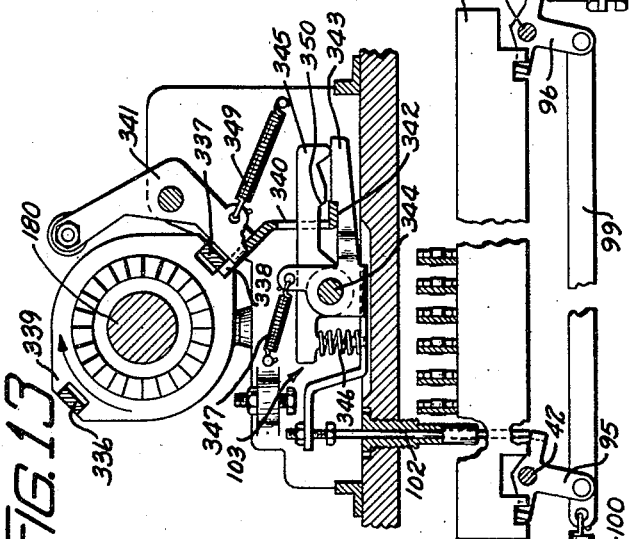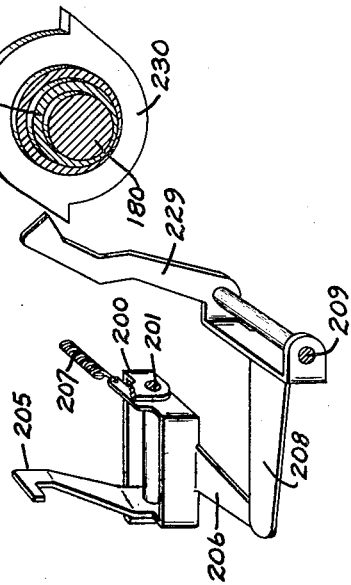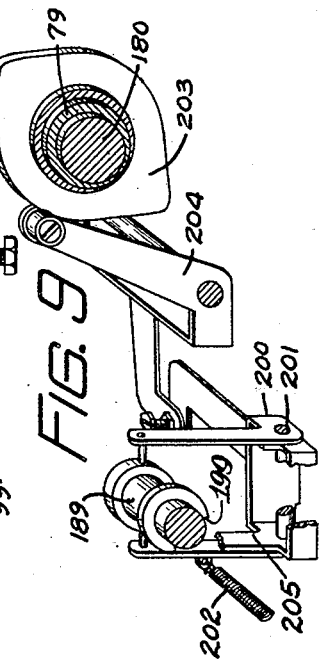

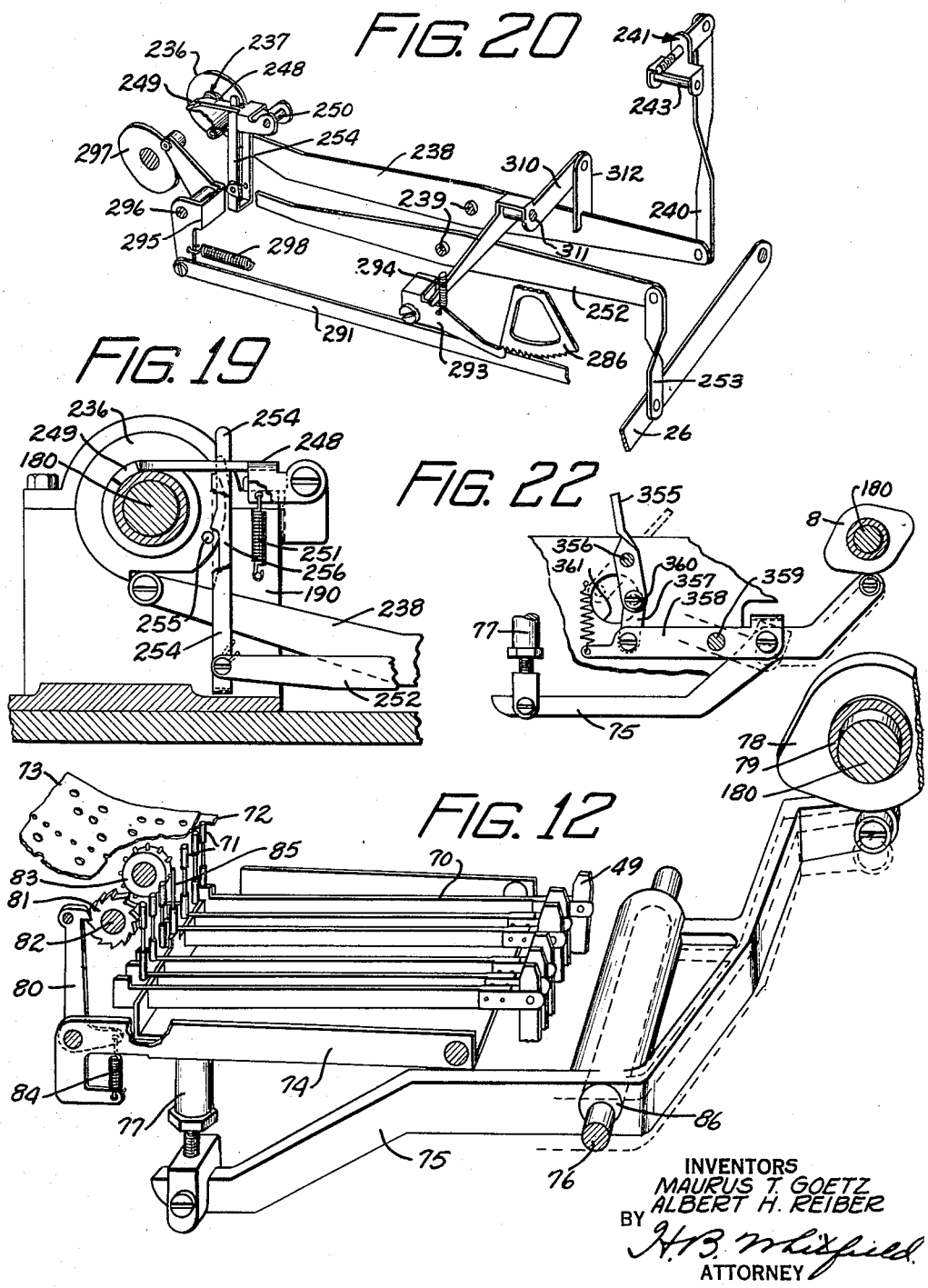

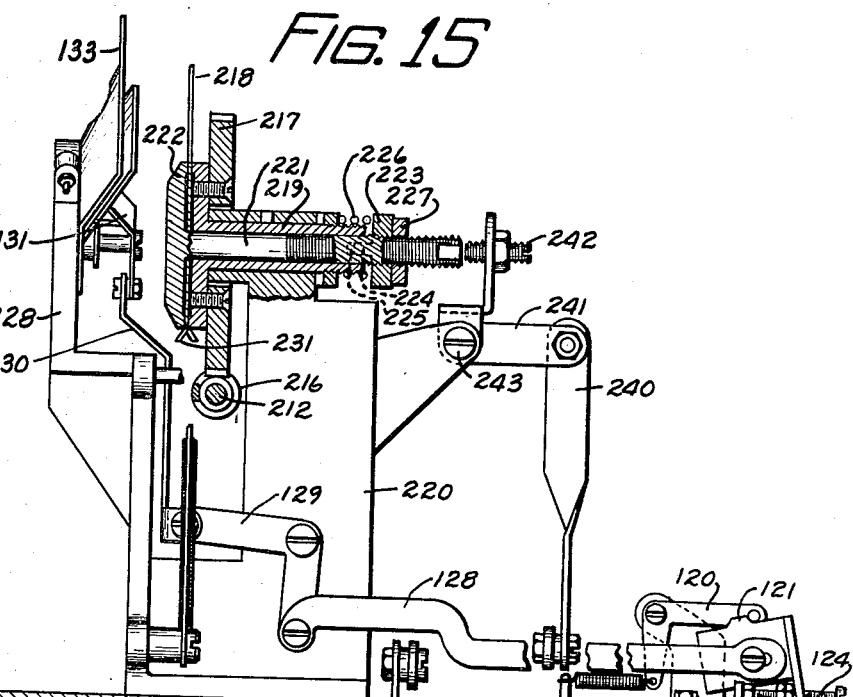

Patented Feb. 2, 1937

2,069,240

UNITED STATES PATENT OFFICE 2,069,240

KEYBOARD PERFORATOR AND COUNTER

Maurus T. Goetz and Albert H. Reiber, Chicago, Ill., assignors to Teletype Corporation, Chicago, Ill., a corporation of Delaware Application June 3, 1932, Serial No. 615,104

27 Claims. (Cl. 164—112)

This invention pertains to type setting systems and apparatus therefor, and more particularly to perforators and counters which may be utilized for preparing a perforated strip for the automatic control of composing machines.

The familiar slugs or lines of type produced by composing machines of the linecasting type are made through the instrumentality of matrices which consist of small brass units carrying indented characters in their edges and which are of different thicknesses due to the fact that the characters vary in width. Thus, when these matrices are assembled into a line of predetermined definite length, the number of matrices necessary to complete the line varies with the particular matrices used. The length of the line therefore is dependent upon the thicknesses of the characters or matrices composing the line and not merely upon the number of characters included in the line. Hence, it is necessary during the preparation of a perforated strip representing lines of composed matter for the production of the slugs or lines of type to totalize the various thicknesses of matrices corresponding to the code perforations made in the strip, so that the operator will be apprised of the length of the line remaining as each key is operated and can thus judge the justifiability of the line.

Composing machines of the particular type to which the present invention relates are also provided in addition to the usual character matrices with expansible space bands, or justifying matrices or word spacers which comprise a portion comparable to and having the contour of a character matrix and which is positioned in the line of matrices usually between each series of character matrices comprising a word, and this portion has slidably connected thereto and depending therefrom a wedge portion. By means of these wedge portions, the space bands are adjusted between certain ranges of thickness before the casting operation is performed. To meet this twofold condition a counting device to indicate to the operator the totalized thickness of the matrices in a line during the process of composition and the number as well as the minimum, maximum and variable thickness of the space bands in the line is, of course, highly desirable.

To accomplish the accurate counting or totalizing of the matrices in the composed line, the apparatus of the present invention is provided with a counting mechanism and an indicating mechanism arranged to count proportions, due to the fact that it has been found advantageous to assign the character matrices to definite groups on the basis of their proportionate widths; that is, it has been found desirable to divide the widest characters into 18 units and to establish a number of different groups on the basis of the following unit sizes: 6, 7, 8, 9, 10, 11, 12, 13, 14, 15, and 18. In this system 18 units are equivalent to the set or em quad size of the font of type. Therefore, the lower case "a" would, for example, be assigned to group 11 regardless of the font or style of type, signifying that a lower case "a" is 11 units in width, a unit being not an actual dimension but merely a proportion of the quad size in the particular font of which it is a part. Thus, the present apparatus can be used for any size of type provided only that the characters in the various fonts have the same unit grouping and an interchangeable space band segment be chosen to suit the set size of the font of type.

The principal object of the present invention is to provide a keyboard perforator and counter which is of entirely mechanical construction and which is capable of being operated at very high speeds with extreme accuracy.

The above and other objects of the present invention are accomplished by the provision of a keyboard device designed to prepare a perforated tape in which the perforations represent lines of composed matter, and also designed to take account of the number of characters or matrices composed so that in a line of predetermined length the amount or length of the line remaining to be filled or completed will always be ascertainable. The keyboard includes keylevers arranged in a manner charactersistic of typewriters and has positioned operatively with respect thereto two groups of selector elements, one of which controls a perforator and the other controls a counting mechanism; the latter totalizes the thicknesses of the characters or matrices making up the line and includes the feature of indicating to the operator the approach of the totalization to a predetermined length of line.

The selector elements of each group are arranged in pairs, so that the depression of one element of each pair of elements through the depression of a keylever causes the operation of the other element of that pair in a reverse direction whereby members operatively associated therewith will be operated in varying permutations to control the selective operation of the perforating mechanism and the perforation of the tape or strip accordingly, and the operation of a counting mechanism, which functions to count progressively the cumulative proportionate thicknesses of the matrices to be composed in the line as represented by the transverse row of perforations in the strip. The counting mechanism is also arranged with elements operated differentially for each operation of the space key of the keyboard mechanism for indicating to the operator the minimum and maximum movement of space bands or the justifiability of the line, so that the operator can quickly and easily determine with exactness the expansibility of the line and, consequently, whether the line of the matrices will be properly cast by the line-casting machine.

Specifically, the counting mechanism involves a plurality of peripherally notched discs which are set permutably in accordance with the permutation bars operated upon the depression of the keylevers to select one of a plurality of rods, there being one rod individual to each of the units of the 18 units of the count employed, as previously noted, and one of which is selected invariably for each operation of the associated notched discs. Cooperating with these rods are a plurality of members constituting a counting barrel, which are mounted to rotate with a shaft which normally tends to rotate by power communicated from a continuously rotated motor through a friction clutch, but which is prevented from rotating due to the engagement of one of the elements with a cooperating part of the selectable rods. The shaft with its selectable elements is released for rotation for each operation of the keylevers which function first to release a cam shaft, which is operative invariably through a definite cycle and functions to control the withdrawal of a previously selected element and to actuate another element invariably in a fixed angular position indicative of the zero position. The withdrawal of the previously selected element releases for rotation the shaft on which these elements are mounted and the shaft rotates until it is arrested due to the engagement of the newly selected element with a selecting rod which has been selected through the operation of the notched discs. The degree of rotation of the counting barrel is transmitted through suitable shafts and gears to a pointer which is advanced under the tension of a spring and which is restored to its normal or starting position by the energy stored in the spring upon the depression of a keylever of the keyboard device allotted for that purpose. The pointer moves along a graduated scale to indicate to the operator the cumulative thicknesses of the matrices composed in the line represented by the perforations in the tape; and operative in accordance with the operation of the space key and representative of the minimum and maximum expansibility of the space bands inserted between words are two pointers moved differentially to indicate the aforementioned condition, so that the distance between the pointers represents the expansibility of the line of matrices with their associated space bands. When the pointer, which indicates the cumulative thicknesses of the matrices, is moved into the range of the scale between the two differentially movable pointers, the operator then knows that the line of matrices represented by the perforations in the tape can be properly delivered to the linecasting machine for the casting operation. The return to normal of the differentially movable pointers is achieved simultaneously with the matrix index pointer through the intercontrol of the mechanism for the return of the index pointer to its normal or starting position.

A better understanding of the invention may be had from the following description, taken in conjunction with the accompanying drawings wherein:

Fig. 1 is a perspective view of a keyboard perforator and counter embodying the features of the present invention.

Fig. 2 is a perspective view of the keylever and perforating counter selector mechanism.

Fig. 3 is a longitudinal elevational view of the perforating selecting bar unit.

Fig. 4 is a longitudinal elevational view of the counter selector bar unit.

Fig. 5 is a sectional view showing some of the elements of the counter mechanism.

Fig. 6 is a perspective view showing the transfer device of the selector mechanism.

Fig. 7 is a perspective view of the counting unit.

Fig. 8 is a cross-sectional view of Fig. 7.

Fig. 9 is a perspective view showing one of the operating mechanisms for the counting unit.

Fig. 10 is a perspective view showing the mechanism for operating the zero pin.

Fig. 11 is a longitudinal sectional view of the operating cam shaft.

Fig. 12 is a view showing the control elements of the perforating mechanism.

Fig. 13 is a sectional view taken on the line 13—13 of Fig. 11 and shows the clutch release mechanism.

Fig. 14 shows the driving connection to the matrix-thickness counting pointer.

Fig. 15 is a partial cross-sectional view of a part of the counting mechanism.

Fig. 16 is a fragmental rear view of the indicator dial.

Fig. 17 is a fragmental perspective view taken on the line 17—17 of Fig. 16.

Fig. 18 is a fragmental front view of a portion of the indicating mechanism.

Fig. 19 is a cross-sectional view taken on the line 19—19 of Fig. 11.

Fig. 20 is a view showing the operating mechanism of a part of the indicating unit and the release mechanism therefor.

Fig. 21 is a fragmental perspective view of a part of the counter mechanism.

Fig. 22 is a view showing an alternative arrangement of the perforating mechanism control means.

Referring now to the drawings wherein like reference characters indicate the same part throughout the several views and more particularly to Fig. 1, there is shown a keyboard unit, a perforating unit, a counter mechanism, and an indicating mechanism indicated generally by the numerals 21, 22, 23, and 24 respectively, all of which are mounted on a common base 25. The keyboard unit 21, mounted on the base 25, comprises a plurality of key levers 26 extending from the rear of the base 25 and to the front thereof, and provided with keys 27. In addition to the key levers 26, which may be referred to as character key levers; that is, key levers representative of letters and/or numerals, are key levers indicated by the numerals 28 and 29 with their associated keys which are referred to as unshift and shift key levers respectively. There is also provided a space key lever 30 which extends in front of the other key levers.

As is more clearly disclosed in Fig. 2, the keylevers 26, 28, and 29 are pivoted on a rod 31 and are normally upheld by springs 32. These key levers, as previously described, are provided with keys 27 and extend over a number of pairs of code bars 35 and 36 included in the perforator selecting unit indicated generally by the numeral 37, and pairs of bars 33 and 34 included in the selecting unit of the counting mechanism indicated generally by the numeral 38. The bars 35 and 36 of each pair are supported, Fig. 3, by a pair of T-shaped rocker arms 40 and 41 mounted on pivot rods 42 and 43 and having oppositely off-set lugs 44 and 45, which uphold the code bars 35 and 36 respectively of the corresponding pair of code bars. The rocker arms of each pair of code bars are pivoted to and reciprocate a permutation bar 46 and these bars are connected to bars 49 on a rod 50. Like the pairs of code bars 35 and 36, the pairs of bars 33 and 34 of the selecting unit 38 are mounted on rocker arms 52 and 53, but in connection therewith, it is noted that these particular bars do not have their upper edges notched as indicated for the bars 35 and 36. The rocker arms 52 and 53 are mounted on pivot rods 54 and 55 and have oppositely off-set lugs 56 and 57 which uphold the bars 33 and 34, respectively, of the corresponding pair of bars. The rocker arms 52 and 53 of each pair of bars are pivoted to and reciprocate a permutation bar 58 and these bars are secured to vertically extending Y-shaped members 59 as shown in Fig. 4. The Y-shaped members 59 are pivoted on a rod 60 and are each provided with an aperture 61 which is substantially larger than a rod 62 positioned below and to one side of the pivot rod 60. The purpose of the rod 62 and the aperture 61 in each of the Y-shaped members 59 is to limit the movement of these members and to ensure their proper cooperation with other associated elements as is more clearly apparent in the description hereinafter.

Each key lever 26 is arranged to depress one of the code bars 35 or 36 of each pair of code bars, and through the medium of the rocker arms 40 and 41 lifts the other code bar either to advance or retract the corresponding permutation bars 46 to impart corresponding movement to the associated pivoted member 49. The permutation bars 46 are set in characteristic combinations and for this purpose the code bars 35 and 36 are provided with notched upper edges, the bars of each pair being complements; that is, the high portions of one bar are opposite the low portions of the other bar of the same general pair. It is also noted that the code and permutation bars have no normal position and are moved back and forth by the key levers. As is clearly apparent from Fig. 3, the bar 35 is raised and the bar 36 is depressed by certain key levers. Also since each key sets the code bar in its individual combination, two keys cannot be completely depressed at the same time and any attempt to do so will bring the code bars to their mid-positions, which is, of course, a non-selecting position.

The pivoted members 49, as more clearly shown in Fig. 12 which illustrates schematically the mechanism of the perforating unit 22, co-act with punch interference elements 70, there being one of these elements individual to each of the members 49. The tape perforating unit controlled by the keyboard also comprises a set of punches 71 movable through a guide plate 72 and coacting with a die plate (not shown) to perforate a tape 73. The punches 71 are selectively operated by a hammer 74 and the interference elements 70, one for each of the punches 71. The actuator or hammer 74 is connected to an arm 75 pivoted on a shaft 76 through an adjustable connection 77. The arm 75 is arranged to be operated periodically or in timed relation to the other parts of the machine from a cam 78 mounted on a sleeve 79 as will be more fully described hereinafter. Cam 78 is provided with two similar cam surfaces since two complete operations are performed during one complete revolution of the cam; that is, for one complete cycle of operations the cam is permitted to rotate 180° or one-half revolution, thus enhancing the speed of operation of the apparatus. There is also secured to the actuator or hammer 74 a pawl 80 which cooperates with a ratchet wheel 81 secured to a shaft 82 which also carries a pin or feed wheel 83.

The pins of the wheel 83 cooperate with feed perforations in the tape for effecting its advancement to bring an unperforated area in alignment with the punches 71. When the actuator 74 is moved upwardly to perforate the tape in accordance with the selected punches 71, the pawl 80 is likewise moved vertically to a position where it engages the next succeeding tooth on the ratchet wheel 81. The pawl 80 is pivotally secured to actuator 74 and is connected thereto through a spring 84. Consequently, when the actuator 74 is returned to its normal position or the position shown in Fig. 12, the pawl 80 will assume its normal position and in doing so will cause the advancement of the ratchet wheel 81 a distance of one tooth thereof and the corresponding advancement of the tape. There is also associated with the punches 71, a punch 85 referred to as the feed hole punch, which is operated each time the actuator 74 is operated, and regardless of the selection of the punches 71, for perforating the feed holes in the tape.

The pivot shaft 76, as shown in Fig. 12, is provided with an eccentric portion 86 and has a handle 87 secured to its front extremity, Fig. 1; also cooperatively arranged on an integral collar of the shaft 76 are oppositely disposed notches 88 which cooperate with spring members 89 to hold the shaft in either of its set positions. By having the shaft 76 provided with an eccentric portion 86, the arm 75 may be moved through the medium of the handle 87 out of operative relation with cam 78 and thus prevent the operation of the actuator 74 upon the rotation of cam 78.

Each key lever 26 in addition to actuating the code bars 35 and 36 also operates a universal bar 93, which like the code bars 35 and 36, is guided in a comb bar 94 and is also supported on and operates a pair of rocker arms 95 and 96 (Fig. 13), but the universal bar has no complementary bar, and the rocker arms 95 and 96 which are pivoted on rods 42 and 43, respectively, are connected to a longitudinally movable bar 99 which is held in its normal, left-hand position by a spring 100. Operatively associated with the rocker arm 95 is a rod 102, slidable in a bushing, which cooperates with mechanism indicated generally by the numeral 103 to control the rotation of sleeve 79. Associated with rocker arm 95 and secured to a projecting portion 104 of the base or frame 25 is an adjustable stop screw 105. The purpose of the stop screw 105 is to determine definitely the initial movement of the key levers 26 before the universal bar 93 is operated to effect the operation of the mechanism 103 and the rotation of sleeve 79. Under the operating conditions of the mechanism covered by the present application, the stop screw 105 is adjusted so that the key levers 26 must have covered at least 60% of their length of travel before the rod 102 is effective to actuate the mechanism 103.

The key levers allotted to the letters and numerals, as more clearly disclosed in Fig. 2, are each provided with a slidable code bar 106, which co-acts with the pairs of code bars 33 and 34 of the counter selecting unit 38. Each code bar 106 is slotted at its forward end in which fits a pin 107 secured to each of the key levers 26 and is pivoted at its rear end to a rocker member 108. Rocker member 108 extends transversely of the key levers 26 and is pivotally mounted on stud pins 109 fixed in the base or frame 25. Inasmuch as it is desired to operate the longitudinally movable members 58 associated with pairs of bars 33 and 34 in different permutations, the code bar 106 individual to each of the key levers 26 is arranged with control projections 110 and 111 in different positions with respect to the bars 33 and 34, a control projection or portions thereof being provided for each pair of bars, so that these bars upon the depression of the respective key levers 26 will be operated in different combinations for the several key levers. It may be noted at this point that the projections 110 and 111 are arranged in varying permutations and accomplish the same result as having the upper edges of the bars 35 and 36 notched in varying permutations to effect the corresponding movement of the permutation bars. Inasmuch as each key 27 usually represents two characters (except function keys), one in the upper case and one in the lower case, and since the width of the upper and lower case characters assigned to a key may vary and it is desired to distinguish between these widths and to effect a corresponding operation of the counting mechanism, it is found advantageous to provide shiftable code bars of the kind represented by the code bar 106.

As previously mentioned, the code bars 106 are secured at their rear ends to the rocker members 108. Rocker member 108 is adapted to be rocked to either of its two positions upon the depression of key lever 28 or key lever 29, depending upon whether the selection is in the lower or upper case position. In the event it is desired to select a character in the lower case position, key lever 28 will be depressed which pivots about rod 31 and causes the upper end of rocker member 108 to move forward, as indicated in Fig. 2, through the medium of links 112 and 113, the latter of which is secured to bracket 114 fastened to the rocker member 108. The link 112 is pivoted to an arm 115 which is secured to a projecting portion 116 of the base or frame 25. The forward end of the link 112 has oppositely disposed members 117 positioned on opposite sides of the key lever 28. Consequently, when the key lever 28 is depressed, it moves link 112 about its pivot 118 and causes through the link 113 the rocker member 108 to rock forward about the bearings 109. Rocker member 108 in moving, as indicated, causes the code bar 106 of each of the key levers 26 to move relatively to its associated key lever and position the projections 110 and 111 above the bars 33 and 34 in a different permutative arrangement. Under such circumstances, the bars 33 and 34 will be operated in different combinations than when the rocker member 108 was in its shifted or backward position as viewed in Fig. 2. The rocker member 108 will be retained in its set position by means of a spring pressed jockey 120 which coacts with a projection 121 formed on bracket 122 which is secured to the rocker member 108. The bracket 122 is slotted at 123 through which extends, Fig. 15, a screw 124 secured to the base 25 at 125. By means of nuts 126, the length of throw of the bracket 122 may be varied to position the projection 121 properly with respect to the spring pressed jockey 120.

Also secured to the bracket 122, Fig. 15, is a link 128 connected to a bell crank 129 which operates through a link 130, a target 131 which has on its front surface colorations indicative of the position of the rocker member 108. In the particular embodiment disclosed, the target is visible through an opening 132 (Fig. 1) formed in a dial or scale 133 of the indicating unit 24 and serves to indicate to the operator by means of colors the position of the rocker member 108.

When it is desired to operate the rocker member 108 to its shifted or upper case position, key lever 29 is depressed which through links 136 and 137 and the bracket 138, which is secured to the front face of the rocker member 108, causes the rocker member to move rearwardly about bearings 109 and assume the rearward position. The link 136 is pivoted to a bracket 141 secured to the frame of the machine. The particular movement or operation of link 136 is identical with that described for link 112 associated with key lever 28 and, consequently, further description thereof is not considered necessary. Of course, with the movement of rocker member 108 to its shifted position, the code bars 106 will be moved accordingly and the bracket 122 will be rocked to a position where the jockey roller is on the forward side of the projection 121 as viewed in Fig. 2, and the target 131 will also be shifted.

When a key lever 26 is depressed, the code bars 35 and 36 will be positioned to cause the movement of the permutation bars 46 in varying permutations, and simultaneously therewith the bars 33 and 34 will be moved in accordance with the position of the projections 110 and 111 on the code bars 106 and will cause the movement of the permutation elements 58 in varying permutations. These elements 58 are, as previously described, operatively connected with Y-shaped members 59. These members 59 will be positioned in accordance with the operation of the permutation members 58 and will control the setting of a plurality of notched discs 146 forming a part of the counting mechanism 23, shown more clearly in Fig. 6. Individual to each of the elements 58 and notched discs 146 is a transfer lever 147 which is pivotally mounted on a rod 148 secured to a bracket 149 pivoted on a shaft 150. Integral with the bracket 149 is an arm 151 arranged with a roller 152 which cooperates with a cam 153 secured to sleeve 79. Cam 153 is also provided with two similar cam surfaces to permit a complete cyclic operation for each one-half revolution of the cam. For each rotation of the cam 153, bracket 149 will be moved against the tension of a spring 154 to move the transfer members 147 into operative relation with the Y-shaped members 59; that is, whether they are at the left or right as viewed in Figs. 2 and 6, the transfer members 147 will engage or be free of the upper ends of the Y-shaped members 59 to cause the discs 146 to be rotated upon the movement of the bracket 149 in either a clockwise or a counterclockwise direction. With the Y-shaped members 59 operated in varying permutations in accordance with the movement of the permutation members 58, the discs 146 will likewise be rotated in varying permutations and will correspondingly cause the alignment of the various groups of notches formed in the periphery of the discs. Cooperating with the notches in the discs are a plurality of rods 156, there being a rod individual to each set of notches and arranged with anti-friction rollers 157. Each of the rods 156, as more clearly shown in Fig. 5, is arranged with a spring 159 which tends to move the rod individual thereto radially into the notches of the discs 146, but inasmuch as the notches are arranged so that for each setting of the discs only one group thereof will be in transverse alignment, only one of the rods 156 will be moved radially. Also the notches in the discs 146 are arranged so that when the discs are moved for a subsequent selection, the previously selected rod will be cammed outwardly against the action of its associated spring. The unselected rods 156 are normally maintained in their outward position by the discs 146 against the action of their individual springs 159, as indicated in Fig. 6.

Referring now to Fig. 5 from which the structural mounting of the discs 146 will be apparent, it is noted that a stationary shaft 160 is journaled in a part 161 of the base 25. Rotatively mounted with respect to the shaft 160 are the discs 146 and secured to the part 161 and the shaft 160 are a pair of discs 162 and 163. These discs are apertured near their outer edge to receive the rods 156 which extend longitudinally of the shaft 160 and which are also held in operative relation with respect to the discs 162 and 163 by a coil spring 164 common to the rods 156. Operatively secured to the right hand end of each of the rods 156, as viewed in Fig. 5, is a member 166 which slides in slots 167 formed in a circular member 168. (See also Fig. 21).

To the right of the discs 146, as viewed in Fig. 5, is a counting organ or unit 175, forming a part of the counting mechanism 23, which is rotated by power communicated from a continuously rotating motor 176 through a friction clutch 177 of well-known construction. The motor 176 has a pinion gear 178, Fig. 1, which cooperates with a gear 179, Fig. 11, secured to a shaft 180 and is integral with another gear 181. The gear 181 meshes with a gear 182, Figs. 1 and 5, rigidly secured to a shaft 183, and shaft 183 is supported by ball bearings 184 and 185 fitted in uprights in the base of the machine.

The counting unit 175 includes a shaft 186 on which is formed a worm gear 187, a plurality of slidable and selectable members 188, and a collar 189. It is also noted that the unit 175 is removable as a unit since the shaft 186 has its opposite ends reduced in diameter to be journaled in the shaft 160 and the shaft 183. Attention is also directed to the structural feature of the unit 175 in that it is of a very small diameter thereby permitting of a high degree of rotation and still permits of satisfactory operation. By having the parts near the axis of rotation, the centrifugal action is reduced, and the moment of inertia is materially less, which make possible the rotation of the parts at very high speeds.

More specifically described, the counting unit, Figs. 5, 7, and 8, consists of a sleeve 192 which is pinned to shaft 186, and which has milled in its periphery a plurality of longitudinal slots 193. These slots accommodate the slidable selecting elements 188 which are held against accidental displacement and in their set position by a pair of springs 194 and 195. The springs 194 and 195 cooperate with three notches 196 formed in the outer edge of each of the selecting members 188 and serve to hold the member in either of its two positions. By having two springs 194 and 195 the frictional contact with the elements 188 is correspondingly increased for a spring of a given diameter and there is also a greater safety factor for the retention of the selecting elements 188 should one of the springs break accidentally. The selecting members 188, as previously indicated, are positioned in slots 193 formed in the sleeve 192 and are provided with inwardly projecting portions 197 and 198 as viewed in Figs. 5 and 7.

As was noted near the beginning of the specification, it has been found desirable to divide the widest characters into eighteen units and, consequently, to provide a corresponding counting mechanism or a mechanism which will function to indicate these particular units of width, nineteen selecting members 188 are provided, there being one more than the number of units to ensure proper and accurate operation, since it is not feasible to withdraw and reselect the same member 188 as will presently become apparent. Cooperating with the projecting portion 197 of each of the selecting members 188 is the flanged collar 189, the flange of which is slotted for a portion of its circumference as indicated by the numeral 199 (Fig. 8) and which is secured by means of pins to a bracket 200 pivoted on a rod 201 (Figs. 7 and 9). The bracket 200, as indicated in Fig. 9, is normally under the tension of a spring 202 and may be urged against the tension thereof by means of a cam 203 acting through a pivoted arm 204. The collar 189 is reciprocated periodically in accordance with the operation of cam 203 for withdrawing the selectable member 188 which may have previously been operated. However, with the notch 199 cut therein as shown, which bears a definite relation with respect to the selecting members 188, it is possible to operate one of the members 188 and still not have its selection disturbed by the positive operation of the collar 189.

The selectable members 188 as is more clearly disclosed in Fig. 5 cooperate with the slidable members 166 associated with the rods 156 to arrest the rotation of the counting unit 175 which, as previously indicated, is driven through a friction clutch 177 to cause a corresponding degree of rotation to worm gear 187. The rotation of worm gear 187, which meshes with a gear 210 secured to a shaft 211, causes the corresponding angular rotation of shaft 212 which is geared with shaft 211 through gears 213 and 214 secured to shafts 211 and 212, respectively. Shaft 212 carries at its right hand extremity, as viewed in Figs. 1 and 14, a worm gear 216 meshed with a gear 217. The rotation of gear 217 is variably controlled by the counting mechanism 175, and the rotation thereof in varying amounts is transmitted through sleeve 219 to which gear 217 is fastened to an index hand or pointer 218. The sleeve 219 is rotatably mounted in a bracket 220 and surrounds a shaft 221, the left extremity of which, as viewed in Fig. 15 is provided with an integral disc 222, and the opposite end has a threaded portion. The index hand or pointer 218 is disposed between the disc 222 and the flanged portion of the sleeve 219 to which the gear 217 is fastened and is held in driving relation therewith by means of a nut 223 which has diametrically opposed ears 224 fitted in corresponding slots 225 formed in the sleeve 219. Disposed between the bearing of the sleeve 219 and the nut 223 is a spring 226 which is normally tensioned by adjusting the nut 223 to cause the pointer 218 to be firmly clamped in driving relationship between the disc 222 and the flange of the sleeve 219. The nut 223 is locked in its adjusted position by means of a lock nut 227. Consequently, the disc 222 together with the shaft 221 may be moved axially with respect to the sleeve 219 against the tension of spring 226.

The bracket 220 is provided with a vertically extending portion 228 on which is adjustably supported a sectoral or fan-shaped indicator dial 133. The dial 133 is pivotally held by a collar nut about which it is slightly rotatable, the amount of movement being limited by a slot and screw adjustment. As indicated in Figs. 15 and 16, the pointer 218 is provided at its outer extremity with a reverted portion adapted to fit over and move along the arcuate edge of the dial 133. The annular pivotal portion of the pointer 218 is provided on a part of its peripheral edge with a series of projections 231, adjacent ones of which are oppositely deflected to form a pulley-like groove to receive a flexible cord 232, one end of which is attached to the pointer and the other end being secured to the extremity of a pointer return lever 233. This lever 233 is pivotally mounted on a bracket 234, Fig. 1, integral with the base 25 and is provided with a short arm to which is attached one end of a pointer return spring 235. The other end of the spring 235 is secured to the projecting portion of the bracket 234.

In order to render the spring 235 effective for returning the pointer 218 to its normal or starting position, the driving connection between the disc 222 and the pointer 218 must be broken. To accomplish this result, a cam 236 rotatable through a tooth clutch 237, Figs. 1 and 11, is effective when rotated to operate a lever 238 pivoted on a rod 239, Fig. 20. The lever 238 is attached at its opposite extremity to an arm 240 which in turn is fastened to one arm of a bell crank lever 241, Fig. 15. The opposite arm of the bell crank lever 241 carries an adjustable screw 242 which is substantially in axial alignment with the threaded portion of the rod 222. When the lever 238 is actuated by the cam 236, the bell crank lever 241 is rotated about its pivot 243 and causes the rod 221 to be moved to the left, as viewed in Fig. 15, against the tension of spring 226. The movement of the rod 221 through the action of cam 236 is sufficient to effect the disconnection between the disc 222 and the pointer 218, so that the latter is free to rotate under the action of pointer return spring 235. Under these conditions, the pointer 218 will be returned to its normal or starting position along the scale 133.

As previously noted, the cam 236 is rotated through a tooth clutch 237 which comprises a continuously driving portion 244 and a driven portion 245. The driving portion 244 is fixed to shaft 180 which carries gear 179 driven through worm gear 178 by the motor 176. The driven portion 245 of the clutch 237 is normally urged to the left, as viewed in Fig. 11 by the spring 246, but is held against such movement by a pawl 248 (Figs. 19 and 20), engaging a cam surface 249 formed on the driven portion 245. The pawl 248 is pivoted on a rod 250 and is urged into cooperative relation with the cam surface 249 by a spring 251. When it is desired to operate pawl 248, a special key lever of the keyboard is depressed which may be referred to as the elevator key lever. This key lever in addition to setting the permutation bars of the selecting unit 37 to cause the tape to be perforated with a code signal representative thereof, effects the movement of a lever 252 which is also pivoted on the rod 239. The key lever 26 assigned to the elevator signal is fastened to the lever 252 by a link 253. The opposite end of the lever 252 is secured to a latch member 254 which cooperates with the pawl 248 so that when the key lever 26 is depressed, causing a corresponding movement of the lever 252, the latch member 254 will be moved upwardly and will cause the pawl 248 to be moved free of the cam surface 249. The spring 246 then causes the driven portion 245 of the clutch 247 to move along the shaft 180 and engage the driving portion 244 and cause the rotation of the cam 236. The cam 236, as shown in Fig. 19 carries a pin 255 aligned in its rotation with an arm 256 complementary to the latch 254. The pin is arranged with respect to the cam surface 249 to operate the member 256 just prior to the completion of the cycle of rotation of the cam 236 and causes the rotation of the latch member 254 and the restoration of the pawl 248 to its normal position or in a position to arrest the rotation of the driven portion 245 and causes it to move axially of the shaft 180 or to the right, as viewed in Fig. 11. The purpose of the pin 255 and the arm 256 is to ensure that the cam 236 will invariably be arrested for each cycle of rotation. In other words, the clutch 237 is referred to as a single revolution clutch in that for each release of the driven portion 245, it makes one complete revolution before it is disengaged from the driving portion 244.

It is obvious, therefore, that when bell crank lever 241 is operated by cam 236, the pointer 218 will be free to rotate in a counterclockwise direction, as viewed in Fig. 1, due to the urge of spring 235 until it is arrested by an adjustable stop 262. The stop 262 in the present embodiment (Fig. 16) comprises a substantially Y-shaped portion, the ends of arms 263 and 264 of which are provided with laterally disposed lugs 265 and 266 respectively. The stem portion 267 is provided near its extremity with a pair of laterally disposed projections 268 and 269 fitted snugly in an arcuate slot 270 formed in the dial 133. The stem portion also has intermediate the lugs 268 and 269 a threaded hole to receive a thumb screw 271, Fig. 1, the shoulder of which is adapted to span the slot 270, so that the tightening of the screw will effect a clamping action for the stop member and permits its adjustability.

At the fork of the Y-portion formed by the arms 263 and 264 is a pivoted stop member 272 adapted to swing between the limiting lugs 265 and 266. Stop member 272 has integral therewith a stud 273 against which the pointer 218 is arranged to contact. The purpose of providing a stop such as just described is to permit a wide range of adjustability with a minimum length of slot 270, thus preserving the rigidity of the dial 133.

Upon the depression of each of the key levers 26, one of the selectable members 188 will be moved to the right, as viewed in Fig. 7, or to the left, as viewed in Fig. 5. For the purpose of setting the members 188, an arm 205 (Fig. 10) pivoted to rod 201, arranged with a projecting portion 206 and retained in a normal or unactuating position by a spring 207, is provided. The arm 205 is operated periodically by a cam 230 secured to sleeve 79 mounted on shaft 180. The mechanism operating arm 205 as shown more clearly in Fig. 10 comprises a bell crank lever consisting of arms 208 and 229 pivoted on a rod 209. For each complete rotation of cam 230, arm 229 will be actuated twice and cause the corresponding operation of arm 205. However, cam 230 is rotated only 180° or one-half revolution for each cycle of operation initiated by the depression of a key lever. When arm 205 is moved by cam 230 against the tension of spring 207, the forward end of the arm will engage the member 188 which is at that instant aligned therewith. It is, of course, understood that the counting barrel 175 is at that instant stopped and power is continuously imparted thereto through the friction clutch 177. This results from the previously selected member 188 at that time engaging one of the selectable members 166. In connection with the operation of a member 188 by arm 205, it is noted that the member operated thereby is considered as being in the zero position and when allowed to rotate through power from the friction clutch 177 will continue its rotation until arrested by engaging a newly selected one of the selectable members or plates 166. Consequently, there is a progressive counting of the several units dependent upon the degree of rotation of the counting barrel 175 and the corresponding rotation of shaft 211. That is, there is imparted to the counting barrel 175, and hence to shaft 211, a continually advancing intermittent motion, the amount or degree of rotation during each interval of movement being governed by the particular member 166 selected.

Arm 205 and collar 189 are operated by their respective cams 230 and 203 substantially simultaneously, the arm 205, however, being actuated slightly in advance of collar 189 to ensure the completion of the selection of a new member 188 by arm 205 before the previously selected member 188 is withdrawn by collar 189 because as soon as the previously selected member 188 has been withdrawn, and thus disengaged from the previously selected member 166, the counting barrel is free to rotate; therefore, it is obviously imperative that a new member 188 be selected before this rotation is initiated. Now, since this rotation is begun while the collar 189 is in its right hand position, as viewed in Fig. 5, preparatory to reversing its direction to return to its left hand position (through the medium of cam 203) it is apparent that if the slot 199 in the flange of collar 189 is not long enough the newly selected member 188 will strike the flange before it has had an opportunity to escape from the path of said member 188, thereby holding the collar against the action of its return spring 202. Thus, to preclude this possibility the slot 199 is made of substantial angular dimension which is possible because the first five units of the 18 sub-units beforementioned are not employed and thus no members 166 are provided therefore, and so, except in the selection of the function rod 158 as will presently appear, the first possible stopping point effected by the coaction of the newly selected zero member 188 and the newly selected stop member 166 will be beyond the range of the slot 199, and sufficient time will have been provided for the simultaneously moving parts, namely member 188 and collar 189, to escape each other.

It is now manifest that upon the depression of each key of the key levers 26, one of the selectable members 188 will be actuated by the arm 205 and for certain of said keys the ensuing operations will effect the operation of the counting mechanism. However, for certain others of the keys, namely, the function keys, such as the shift and unshift keys, the space key, etc., it is not desired to have their operation affect the counting mechanism in the same manner as for a character key, which result is accomplished in the following manner. The function key levers (such as 28, and 29) are notched as shown in Fig. 2 and when depressed will operate the pairs of bars 33 and 34 to cause the permuted operation of discs 146 and the consequent selection of rod 158 (Fig. 6). Each of the function keys is similarly notched and will, when operated, always effect the selection of rod 158. Thus, upon the depression of a function key, the selection of a member 188 in the zero position by arm 205 will be accomplished as before described, but the selecting rod 158, called the function selecting rod (Fig. 6), will be selected by the code discs 146, which rod is in that angular position within the range of slot 199 (Fig. 8), adjacent to the zero position, which position is representative of the first unit of the 18 sub-units; so when the counting barrel 175 is rotated by the disengagement of the previously selected member 188 it will rotate only a distance of one angular space representative of one unit thickness. The counting mechanism is operated correspondingly; that is, the pointer 218 is moved one unit, but, as will be explained presently, this movement will not disturb the ultimate totalization of the character thicknesses.

If the next succeeding key depressed is also a function key the selection of a new member 188 in the zero position (the previously selected member 188 having moved only one step or angular space out of the true zero position) by the arm 205 will be achieved as previously described, but in this event the reciprocal movement of the collar 189 will not operate to withdraw the previously selected member 188 due to its being positioned within the range of slot 199 and hence two adjacent members 188 will be in their operative positions; therefore no movement of the counting mechanism will result because the function rod 158 is still in its effective or selected position, not having been cammed out by the code discs 146 because the permuted arrangement of the latter remains unchanged for a function selection.

Now, if the next key depressed is a character key, the arm 205 will operate to select a member 188 in the usual manner, but since, as was described, the counting barrel 175 did not move during the preceding operation the member 188 in the zero position is already in its operative position, it being remembered that two adjacent members 188 are in their operative positions, and as before the reciprocation of collar 189 will not operate to disturb their operative positions. However, a new selecting rod 156 and its associated member 166 will be operated by the permutative change of the code discs 146, the effect of which will be to cam out the previously selected function rod 158; and the withdrawal of the function rod will permit the counting barrel 175 to rotate until the first selected member 188 of the two already selected members engages the newly selected member 166. In this case the rotation of the counting barrel 175 will be equal to an angular distance corresponding to a thickness of one unit less than the thickness represented by the newly chosen selected rod 156 and its associated plate 166, but the counting mechanism having already been operated in accordance with one unit or angular distance upon the selection of the first of the two selected members 188 will now cause the pointer 218 to indicate the true proportionate thickness of character represented by the key operated.

In order that the counting will be accurate and the number of different thicknesses of matrices may be a minimum, each em, the unit of type measure, is divided into eighteen equal sub-units, eighteen having been found by experience to be a suitable number, and this in turn explains the reason for the corresponding number of members 188 with the addition of one member to ensure proper operation. Matrices of certain numbers of sub-units in thickness are not used; that is, no matrices as thin as 1, 2, 3, 4, or 5 sub-units are used and eleven different thicknesses have been found to be a practical number. To compensate for the gap resulting from the omission or non-use of groups corresponding to the widths indicated and to ensure the proper and correct operation of the counter, the selectable rods 156 corresponding to these particular units have been allotted, so that regardless of the operation of the selecting mechanism of the keyboard, at least one of these selecting rods will be selected for operation to prevent the unlimited rotation of the counting barrel 175.

It is well known in the typographical art that the amount of possible justification in any assembled line of matrices is determined by the number of spacebands contained therein. As previously mentioned a spaceband comprises a matrix shaped portion in which is slidably carried a wedge portion. Thus in order that the spaceband may be effective to justify a line, the difference between the aggregate or totalized thicknesses of the matrices in the line and the predetermined length of line must be equal to or less than (preferably the latter) the aforementioned difference in thickness or expansibility of the spaceband, so that when the wedge portion is slidably moved along the matrix shaped portion which is held in alignment with the rest of the matrices in the line, it will tend to "fill" up, so to say, the space left between the last matrix and the limiting gauge representing the length of the line. Also a similar result will be obtained when two or more spacebands have been included in the line in which event the spacebands will be effective to justify the length of line when the difference between the totalized thicknesses of the matrices and the length of the line is less than the sum of the difference in thickness or expansibility of the spacebands.

In the operation of the keyboard arrangement embodied in line casting machines, the operator may watch the assembly of the matrices and spacebands in the assembling elevator and thus personally determine the justifiability of the line. However, in the automatic operation of a composing machine by means of a perforated tape the justification must be predetermined and accordingly the present invention has provided a device which will at all times indicate with exactness the relation between the totalized thickness of the matrices in a line and the aggregate amount of expansion possible with the spacebands.

Referring now to Fig. 1, the dial 133 has adjacent its outer edge a scale or series of graduations representing the number of ems in a line of maximum length. The reverted end of pointer 218 moves along this edge of the dial from left to right toward zero in response to the totalization of the matrix thicknesses by the counting mechanism; that is, for each rotation of shaft 212, whose degree of rotation is determined by the extent of rotation of counting barrel 175 which is directly dependent upon the particular selecting element 166 which is operated, pointer 218 will be rotated a corresponding amount. Consequently, the distance from the pointer 218 to zero indicates the amount of space left in the line to be filled with matrices when the line contains no spacebands. When spacebands are inserted in the line, the space remaining to be filled varies with the number of spacebands inserted.

To indicate the justifiability of the composed line, a pair of pointers 278 and 279 are provided, the distance between the pointers indicating the amount of expansibility of the spacebands. Since the distance from zero on the scale to pointer 278 represents the sum of the thin edges of all the spacebands (whether one or more) in the line and the distance from zero to pointer 279 represents the sum of the thickest ends of the spacebands, it is apparent that the distance between the pointers 278 and 279 represents the difference between these sums, which is the amount of expansion or expansibility of the spacebands contained in the line. Therefore, the space left in the line to be filled when spacebands are inserted is represented by the distance between the pointer 218 and any point between pointers 278 and 279. With the pointers 278 and 279 indicating the conditions previously expressed, it is necessary to move these pointers differentially or through different amounts and, in order to attain this result, there is rotatably mounted on a stud shaft 280, mounted on the projecting portion 228 of bracket 220, the pointers 278 and 279. As shown in Fig. 18, the pointers 278 and 279 are U-shaped at their pivotal ends to provide a substantial bearing on shaft 280 and have segmental gear portions 281 and 282, respectively, which mesh with segmental gears 283 and 284, respectively, pivoted on a stud shaft 285. Integral with the gear 283 and also mounted on the stud shaft is a ratchet segment 286. Gears 283 and 284 and ratchet 286 normally tend to rotate in a counterclockwise direction, as viewed in Fig. 18, due to the action of springs 287, Fig. 1, distended between the U-shaped portions of the pointers 278 and 279 and the base 25.

The ratchet 286 cooperates with a pawl 289 which is pivoted at 290 to a periodically reciprocated bar 291. The bar 291 is slidably mounted in a bracket supported on the base 25 and has one end secured as shown in Fig. 20 to one arm of a bell crank lever 295. The bell crank lever 295 is pivoted on a rod 296 and has its other arm operatively related to a cam 297 which is also secured to sleeve 79 mounted on shaft 180. Like cams 78, 153, 203, 230, cam 297 is also provided with two similar cam surfaces to permit of two cycles of operation for each complete revolution of the cam, that is, cam 297 is likewise permitted to rotate only 180° or one-half revolution during each cycle of operation. Bell crank 295 is maintained in normal operative relation with cam 297 by a spring 298. For each reciprocation of bar 291, the pawl 289 will also be reciprocated but the effectiveness thereof is dependent upon other elements. There is also associated with the ratchet wheel 286, a holding pawl 293 normally urged into engagement with the ratchet 286 by a spring 294. The effectiveness of the pawl 289, which may be referred to as a stepping pawl, on the ratchet wheel 286 is determined upon the operation of the space key 30 which through notched lever 301 controls the position of a vertically extending element 302, Fig. 18. Lever 301, like levers 26, 28, and 29, is also adapted to be pivoted on rod 31. The element 302, as shown in Fig. 18, is mounted loosely on a bushing or screw secured to lever 301. With this construction, the element 302 is free to move to the right or left on the bushing or the screw secured to the lever 301. The element 302, as clearly shown in Fig. 1, has its upper portion formed as a hook which engages the right hand arm of a lever 304 and is held in that position against a stop plate 300 by a spring 303, one end of which is secured to the element 302 and the other end to an eyelet formed in the bar 291. Upon the depression of the space key 30, lever 301 is operated and causes the downward movement of element 302 which imparts rotation to pivoted lever 304. The left hand arm of pivoted lever 304 is notched near its extremity, and engaging the shoulder thereof is one arm of a lever 305 which is also pivoted to the bar 291 and consequently moves with it. Both levers 304 and 305 are under the influence of springs arranged to move these elements toward each other as shown more clearly in Fig. 18. Upon the downward movement of element 302, the lever 305 will be released from the shoulder formed on the lever 304 and the pawl 289 will be moved about its pivot 290 by the action of pawl 305 through its associated spring. Now when the bar 291 is moved to the left and with the pawl 289 engaging one of the teeth in the ratchet 286, the ratchet 286 will be moved in a clockwise direction thus causing the movement of the pointers 278 and 279 through their associated gears. The leftward movement of bar 291, and hence lever 304, will, because element 302 is held by plate 300, also cause the disengagement of lever 304 from element 302. When the member 291 has moved to the left to its full extent, the pawl 289 will be disengaged from the ratchet 286, which will be held in its set position by the co-action of holding pawl 293, by the operation of a projecting portion 306 formed on lever 305 with bar 307 secured to the base 25. At the same time the lever 304 will be rotated in a clockwise direction by the interaction of portion 306 and bar 307 in a manner to latch lever 305 and hold it in the latched position shown in Fig. 18 where it will be maintained until the lever 304 is again operated regardless of the movement of the bar 291. Bar 291 and the parts carried thereon are restored to their unoperated or rightward position by the action of spring 298 on member 295 (Fig. 1). In order to prevent repeating the operation of pawl 289 should the space key be held depressed for a period longer than that required for a complete cycle of operation of the bar 291 the element 302 due to its floating construction is arranged to cooperate with the extreme end of the pawl 304 so as to be swung to the right into the dotted line position shown in Fig. 18, thus tensioning spring 303. Now, when the space key 30 is released and permitted to return to its normal upward position, the element 302 will be elevated sufficiently to permit its hook portion to clear the right arm of lever 304 whereupon the contraction of spring 303 will operate to return element 302 to its vertical position in normal cooperative relation with lever 304.

The lever 301 associated with the space key 30 is notched, as shown in Fig. 2 and as described for the shift and unshift keylevers 28 and 29 respectively. When the space key 30 is depressed the notched lever 301 is also depressed and in addition to operating lever 304, the pairs of bars 33 and 34 of the selecting unit 38 will be operated to set correspondingly the Y-shaped members 59. The setting of the Y-shaped members 59 will result in the setting of the discs 146 and the selection of the function rod 158 in a manner and for a purpose previously described with reference to the operation of the function keylevers. The counting mechanism will also be operated to the limited extent previously described but such operation will be compensated for upon the subsequent depression of a character key so that actually the counting mechanism does not indicate the operation of the function keylevers.

Referring to Fig. 20, the mechanism for the release and restoration to normal of pointer 218 has been previously described and in addition to the restoration of pointer 218 it is also desired to restore pointers 278 and 279 to their normal position. To accomplish this result, there is provided, as shown more clearly in Fig. 20, a member 310 which is pivoted on a rod 311. Member 310 has a depending portion 312 which straddles the pivoted lever 238 operated by cam 236. The other portion of the lever 310 is above and in engagement with the holding pawl 293; consequently, when the lever 238 is operated by cam 236, lever 310 will be moved about its pivot 311 in a direction such as to cause the holding pawl 293 to disengage the teeth of ratchet 286 and allow the ratchet 286 to return to its normal position by the action of spring 287.

Since the amount of line to be filled with characters varies with the number of spacebands in the line and since the number of spacebands in the line governs the amount of justification required, it is apparent that as more spacebands are used in a line less characters can be placed in the same line, so that it becomes necessary in this event to indicate to the operator the arrival of the justifiability of the line; that is, that the line is reaching a suitable length to permit automatic justification, provision for which is made to indicate this arrival by lighting a signal lamp 315. In other words, the lighting of the signal lamp 315 apprises the operator when the matrix pointer or index hand 218 is about to move over that portion of the scale, indicated by the spaceband pointers 278 and 279 representing the range of justification of the line. Since this range varies with the number of spacebands in the line, the point at which the signal operates must also vary.

The mechanism for operating the signal lamp 315 is shown in Fig. 17 and comprises a substantially U-shaped member 316 pivotally mounted on a bracket 317 secured to the base 25. Member 316 is provided with an arm 318 which is adapted to operate a pair of contacts 319 which are normally open and which when closed serve to complete the circuit of the signal lamp 315. Pivotally mounted on member 316 is a swinging member 320 at one end of which is carried a cam roller 321 and at the other end of which is mounted a cam roller 322. Referring to Fig. 16, it is noted that the pointer 218 is provided with a cam portion 323 which co-acts with the cam follower 321, while the pointer 279 as shown more clearly in Fig. 18 has a cam portion 324 which cooperates with cam follower 322 mounted on one extremity of the pivoted member 320. It will thus be observed that the amount of rotation of member 320 is dependent upon the combined action of cam portions 323 and 324 upon the swinging member 320, the contours of the cams being cooperatively related. Consequently, in order to open or close contacts 319, it is necessary to operate member 320 through the joint action of cams 323 and 324.

Referring now to Figs. 1, 11, and 13, the shaft 180, which is driven continuously due to the corresponding rotation of gear 179, has rotatively mounted therewith the sleeve 79 which carries cams 78, 153, 203, 230, and 297 for accomplishing the several previously described functions. The rotation of the shaft 180 in its bearings supported by uprights 190 and 191 is imparted to sleeve 79 through a combination friction and positive clutch 330. As shown in Fig. 11, the clutch 330 consists of a friction portion 331 and a postive or grab portion 332. Normally, the positive or grab portion 332 is held out of engagement with its operative part by means of a vertically extending member 333 cooperating with a cam 334; that is, with the member 333 cooperating with the cam 334, the right hand portion of the clutch section 332, as viewed in Fig. 11, will be moved out of engagement with the left hand portion thereof against the action of a spring 335. Also the friction portion 331 of the clutch 330 is normally rendered ineffective due to the engagement of diametrically oppositely disposed members 336 and 337 with a projection 338 which normally lies in the path of members 336 and 337 (Fig. 13). With this construction, power from the shaft 180 is constantly and continuously applied to impart a constant tendency to rotate to sleeve. 79 through a collar 339, constituting a part of the friction clutch 331 and the members 336 and 337 which fit in slots formed in the periphery thereof. When the projection 338 is moved out of the path of the then engaged member 336 or 337, as will be described presently, the friction clutch 331 is effective for transmitting power to sleeve 79. Sleeve 79 then rotates through a relatively small angle, and cam 334 is rotated with respect to member 333 such that the right hand portion of the positive clutch 332 is allowed to move to the left, as viewed in Fig. 11, by the action of spring 335; whereupon the teeth thereof engage the teeth of the left hand portion of the positive clutch 332 which is integral with the shaft 180 and which consequently rotates continuously. With the construction just described, the sleeve 79 is driven initially through friction clutch 331 but, after it has rotated a few degrees, the positive clutch 332 is effective for transmitting the power from shaft 180 to sleeve 79 through a positive clutch connection.

The mechanism for controlling the release of clutch 330 is shown in Fig. 13 and comprises the projection 338 which is formed integral with a member 340 secured to one arm of a pivoted lever 341 whose other arm carries a roller and cooperates with the cam collar 339. The member 340 has a projection 342 which normally engages a shoulder formed on the upper surface of a member 343, which is pivoted on a rod 344 and which has an extension apertured to receive rod 102 operated by bell crank lever 95 operatively associated with the universal bar 99. Also mounted on rod 344 is a member 345 which has its right hand end, as viewed in Fig. 13, normally held in engagement with the upper surface of member 343 by a spring 346 positioned between the members 343 and 345 to the left of the pivot rod 344. Consequently, with the member 343 normally urged by a spring 347, the members 343 and 345 will be held firmly in contact with each other. When the universal bar 99 is operated, rod 102 is likewise operated and causes the movement of member 343 clockwise about pivot rod 344, thus moving the shoulder thereof free of the projection 342 of pivoted member 340. With member 343 moved, as described, member 340 as well as the pivoted lever 341, will be rotated about their pivot by spring 349, so that the projection 338 is out of the path of the then engaged member 337. Consequently, and especially with power continuously imparted from shaft 180 to friction clutch 331, sleeve 79 will be rotated. As it rotates, the positive clutch 332 will be engaged as previously described. When the cam collar 339 nears the completion of its half cycle of rotation, the roller on pivoted lever 341 is operated by cam 339 for moving the member 340 and its projection 338 into the path of the next succeeding member 336.

After the universal bar 99 has moved to its normal position by the action of spring 100 which will occur when the key is released, the projection 342 will again engage the shoulder of member 343. However, if the keylever is held depressed, which will result in maintaining member 343 in its rotated position about pivot 344, the projecting portion 342 will engage shoulder 350 formed on the under side of member 345. Attention is directed to the fact that shoulder 350 is not in direct vertical alignment with the shoulder in member 343, but is disposed slightly to the left thereof (as viewed in Fig. 13), the purpose of which is to insure the operation of member 341 by its spring 349 to effect the withdrawal of projection 338 from the path of member 337, when projection 342 is disengaged from the shoulder on member 343. So, when a keylever is held depressed, member 343 will be held in its clockwise position and member 341 will be rotated in a clockwise direction by the collar cam 339 sufficiently to permit the engagement of shoulder 350 with projection 342 and also effect the engagement of projection 338 with a member 336 or 337; then when the keylever is released the members 343 and 345 will be rotated counterclockwise and the projection 342 will slide off of shoulder 350 onto the shoulder on member 343. Whether the projection 342 engages the shoulder on member 343 or member 345, the projection 338 will be moved into the path of the next succeeding member 336. By the arrangement of the members 343 and 345 with their notches as described, thus forming a double trip-off latch, the repetition of the operation is prevented, and a subsequent operation of the universal bar 99 is necessary to effect the release of the clutch mechanism. In other words, if a keylever is depressed for a period longer than a half cycle of rotation of sleeve 79, the sleeve 79 will be invariably arrested due to the arrangement of the members 343 and 345. Of course, as the sleeve 79 approaches the completion of its half cycle of rotation cam 334 cooperates with projection 333 and effects the disengagement of the positive clutch 332 or moves it to the position shown in Fig. 11.

General operation

Inasmuch as the details of the apparatus have been described and since a further understanding of the structure constituting the present invention can be obtained from a detailed description of its operation, such a description follows:

Referring to Fig. 1, the tops 27 of the keylevers 26 carry indicia (not shown) analogous to the well-known typewriter keyboards wherein two sets of designations are used, one for the lower case and the other for the upper case. Assuming that the code bars 106, Fig. 2 are in their forward or lower case position, which will be indicated by the position of target 131 through aperture 132, Fig. 1, and that a character keylever 26 is operated, one of the bars 35 or 36, of each pair of such bars, depending upon which bar is in a vertical position is actuated and causes the permuted operation of the selecting bars 46. Simultaneously with the operation of one bar of each of the pair of bars 35 and 36 of the perforator selector unit 37, the pairs of bars 33 and 34 of the counter selector unit 38 will be operated to cause the permuted operation of bars 58. The selection of the bars 46 will effect the rotation of the pivoted members 49 and the movement of the punch interfering bars 70, Fig. 12, in corresponding permuted combinations.

In the case of the permuted operation of the bars 58 of the selector unit 38, the Y-shaped members 59 will be operated in corresponding permuted combinations for controlling the subsequent setting of the code discs 146. However, these code discs 146 are operated mechanically through the interaction of transfer levers 147 which are mounted on bracket 149 controlled by cam 153 secured to sleeve 79 operated through clutches 331 and 332. Likewise the operation of the code punch pins 71 and the feed punch pin 85 the former in accordance with the position of the punch interfering bars 70, is determined by cam 78 also mounted on sleeve 79.

Sleeve 79, as previously referred to, is driven through a friction clutch 331 and a positive clutch 332 which are rendered effective upon the operation of universal bar 93, Fig. 13, operative on a spring pressed member 99. The universal bar 93 is operated simultaneously with the operation of any of the character keys but has its movement adjusted or rather determined to control predeterminedly the operation of mechanism controlling the release of the clutch 331. This particular mechanism is more clearly disclosed in Fig. 13 and operates upon the vertical movement of rod 102 through its bushing to move member 343 sufficiently to release the projection 342 from its shoulder. Projection 342 will at this time escape shoulder 350, due to the aforementioned fact that shoulder 350 is not vertically aligned with the shoulder on member 343. With projection 342 free of the shoulder of member 343, spring 349 rotates member 341 about its pivot removing the projection 338 from the path of the member 337. Power, of course, is continuously applied to the friction clutch 331 through the shaft 180 from the motor 176 and the interconnecting gears, so that when the projection 338 is moved out of the path of member 337, the driven portion of the friction clutch will rotate. The sleeve 79, being secured to the driven portion of the friction clutch 331, will likewise rotate and will carry with it cam 334 (Fig. 11) which normally effects the disengagement of the positive clutch 332 but after rotating a few degrees, spring 335 is effective for causing the engagement of the clutch 332 and the transmission of power from the shaft 180 through the positive clutch 332 to effect a positive drive connection between the shaft 180 and the sleeve 79. Sleeve 79 carries with it the cams 78, 203, 230, 207, and 153. Cam 78 operates through arm 75, hammer 74 (Fig. 12) and effects the perforation of the tape in accordance with the position of the punch interfering bars 70, as is well understood by those familiar with the operation of perforators and the feed hole punch 85. The movement of the hammer 74 in a vertical direction causes the pawl 80 to engage the next succeeding tooth on the ratchet 81 so that upon the positive restoration of the arm 75, the ratchet 81 will be advanced a distance corresponding to one tooth thereof and will cause the corresponding rotation of the tape advancing wheel 83. The tape accordingly will be advanced to bring an unperforated area thereof in alignment with the punch pins 71 and 85.

In the case of cam 153, the transfer members 147 are moved, due to the actuation of the bracket 149 to rotate the discs 146 associated therewith in a direction dependent upon the position of the Y-shaped members 59 which, as previously described, are operated in accordance with the movement of the bars 58. The discs 146 will, of course, be moved in permuted combinations and due to the peripheral notches one of the rods 156 will be selected while the previously selected rod will be moved outwardly against the tension of its spring 159. Due to the movement of the previously selected rod 156 outwardly or into a non-selected position, its plate 166, Fig. 5, will be moved out of the path of engaged selecting member 188 of the counting barrel 175 which was held against further rotation by such engagement. But operated in timed relation with respect to the cams 78 and 153 is cam 203, which functions through the slotted collar 189 to withdraw the previously selected member 188 of the counting barrel 175 and thus release the counting barrel for rotation through the friction clutch 177. Selecting arm 205 being operated by cam 230 moves the selecting member 188 with which it is at that time in alignment to the left, as viewed in Fig. 5, which is allowed to be so moved due to the fact that the collar 189 is slotted in this particular position. With reference to the members 188 which are arranged about the shaft 186, it is noted that one of the members will be operated by the arm 205 invariably in the same position which has been identified as the zero position so that with nineteen of the members 188, there being one additional member over the total number of units of the count, the degree of rotation of the counting barrel 175 dependent upon the particular plate 166 which is operated, will be representative of the thickness of the character allotted to the particular depressed keylever. Assuming for the purpose of illustration that the keylever allotted to the letter "m" was depressed, the depression of this particular keylever effects the rotation of the discs 146 to select the rod 156 individual to the unit of width allotted to this particular character or to the particular group to which this character has been assigned. Although a rod 156 has been provided at the zero position adjacent to the function rod 158 (Fig. 6), the rod 156 representative of the zero position is never selected, but is only provided for purposes of symmetry; nor is it provided with a stop element 166. Regardless of the particular keylever depressed, the then selected member 188 in alignment with the arm 205 will be moved longitudinally of the shaft 186, and due to the withdrawal of the previously selected member 188 through the movement of the collar 189, the counting barrel 175 will be rotated through the friction clutch 177. The degree of rotation of the counting barrel 175 is determined by the relative position of the selected member 188 in its zero position or in alignment with the arm and the angular displacement of rod 156 with respect to the newly operated member 188. Consequently, with the member 188 moved to the left, as viewed in Fig. 5, the counting barrel 175 will continue to rotate until member 188 engages the plate 166 of the selected rod 156 allotted to the group including the letter "m."

The rotation of the counting barrel 175 also effects the rotation of pointer 218 through the interconnecting gears and shafts an amount corresponding to the angular rotation of the counting barrel 175 or an amount representative of the proportionate thickness of the letter "m", which amount, as previously mentioned, is not an actual dimension but merely a proportion. It is, of course, understood that other letters be of proportionate thicknesses different from that of the letter "m" and hence, if they are allotted to a group other than the group including the letter "m", the pointer 218 will be moved over the scale 133 an amount proportionate to the thickness of the particular letter or character.

As the driven member of the friction clutch 331 continues its rotation, cam 334 engages the vertical post 333 and causes the disengagement of the positive clutch 332 and the cam 339 operates bell crank lever 341 to move the projection 338 against the tension of spring 349 into the path of member 336. Cam 339 is designed to rotate lever 341 clockwise sufficiently to permit projection 342 to clear both the shoulder 350 and the shoulder on member 343, the purpose of which will presently appear. The previously depressed key being released, the universal bar 93 will be restored to its normal position by spring 100 and the member 342 will be moved to the position shown in Fig. 13. With the member 343 in a position shown in Fig. 13, the projection 342 will engage the shoulder thereof and the member 340 will be locked against accidental displacement and will be maintained in that position until a subsequent depression of the same or another key. However, should the keylever be held depressed until bell crank lever 341 is operated by cam 339, the projection 342 will engage shoulder 350 of member 345 and will achieve the same result as if the projection 342 engaged the shoulder on the member 343. Consequently, the sleeve 79 will be arrested invariably for each one-half cycle of rotation thereof. When the keylever is finally released and the universal bar 93 is restored to its normal position, the members 343 and 345 will assume their normal position by the action of the associated springs and the projection 342 will engage the shoulder on the member 343. By the arrangement of the structure in the manner disclosed, the continued rotation of the sleeve 79 in the event of the prolonged depression of a keylever will be prevented and consequently, the false operation of the perforator and the counter will be avoided.

Upon the depression of succeeding character keys, the index pointer 218 will be advanced along the dial in amounts varying with the thickness of the matrices corresponding to the key depressed. However, if during this operation it is desired to perforate and count an upper case character, it is first necessary to depress the shift keylever 29 which will result in the rocking of member 108 and the movement of the code bars 106 individual to each of the keylevers 26 rearwardly. By this operation the target 131 will be moved to indicate the shifted condition of the code bars 106 through the aperture 132, and the member 108 will be maintained in its shifted position by the co-action of the pivoted member 120 with the projection 121 (Fig. 15) on the member 122. Inasmuch as the shift operation is what is termed a function, and since the Y-shaped members 59 will be shifted accordingly, the discs 146 will be operated permutably to select the function rod 158. Likewise, the member 188 then in the zero position will be operated by arm 205 through the instrumentality of cam 230. Also, with the withdrawal of the previously selected member 188 through the operation of collar 189, the counting barrel 175 will be released for rotation and will rotate a distance equal to one angular space, as previously indicated, until the selected member 188 engages the selecting member 166 individual to the selected rod 158. The index pointer 218 will be rotated through a corresponding angle and will so indicate that on the scale. As has already been described, the operation of the function key causes the corresponding setting of the pointer 218, but this actuation or counting is compensated for upon the subsequent selection so that actually the operation of the function keys, such as the shift and unshift keys, are not registered on the counting device. The perforating operation proceeds as usual, as the selecting members 46 individual to the group of code bars 37 will be operated for setting the punch interfering bars 70, as previously described, and consequently the tape 73 will be perforated with a transverse group of holes or perforations allotted to the shift operation. Upon the depression of a character key following the operation of the shift key the various elements of the keyboard and counting mechanisms will be actuated in a manner similar to their operation, previously described, except that the counting and indicating mechanisms will be operated to different extents or amounts for the same keylever. This operation results due to the shifting of the code bars 106 longitudinally of the keylevers 26 whereby the projections 110 and 111 thereof are brought into vertical alignment with different ones of the pairs of bars 33 and 34 so that upon the depression of the keylever corresponding thereto these bars will be operated in different combinations. Consequently, the Y-shaped members 59 may be operated in different combinations than for the depression of the keylevers 26 with the code bars 106 in their normal or unshifted position which manifestly results in the corresponding operation of the selecting discs 146 and the selection of a different rod 156. Under these conditions, the counting barrel 175 will rotate through a different angle and the indicating pointer 218 will be rotated correspondingly.

When the space key or bar 30 (Fig. 1) is depressed, the space keylever 301 operatively connected thereto (in a manner not shown) is actuated and the pairs of code bars 35 and 36 are operated to set the bars 46 in different combinations whereby the punch interference bars 70 are set permutably to effect the corresponding perforation of the tape 73. Since the space key operation is a function, the bars of the selecting unit 38 are operated, as in the case of the shift and unshift keylevers, and consequently the counting mechanism is similarly actuated through the selection of rod 158. However, the effect of the perforations in the tape corresponding to the space function on the linecasting machine is to release a spaceband for insertion into the composed line of matrices and evidence of this fact must be made on the indicator of the keyboard device.

For the purpose of indicating the insertion of spacebands in the line of composed matter evidenced by the presence of space perforations in the tape 73 the pair of pointers 278 and 279 are employed, which are moved differentially, as previously described, according to the number of spacebands used in the line and according to the aggregate amount of expansibility of the spacebands. It has also been noted how the pair of pointers 278 and 279 cooperate with the pointer 218 to notify the operator, by means of signal 315, of the approach of a justifiable line. Specifically, when the space key 30 is operated, the space keylever 301 is also operated and the member 302 (Fig. 18) is moved to release the pawl 304 and permit the movement of the stepping pawl 289 through the pivoted lever 305. Consequently, when the member 291 is reciprocated through the cooperation of cam 297 (Fig. 20) the ratchet sector 286 will be rotated through a distance corresponding to the spacing of one tooth. The ratchet sector 286 will be held in its set position by the holding pawl 293 and will also cause the differential movement of the pointers 278 and 279. The stepping pawl 289 will, of course, be restored to its normal position or the position indicated in Fig. 18 through the operation of a mechanism, previously described.

Now upon the arrival of a justifiable line it is necessary to restore the entire apparatus to its original or beginning of line position. To achieve this result the elevator or end-of-line key is depressed, which as already described, operates pivoted lever 252 (Fig. 20) through connecting link 253 and operating latch 254 to effect the withdrawal of the pawl 248 from the path of lug 249 which forms a part of the clutch 237. The driven member of the clutch is thus caused to engage the driving member thereof and the cam 236 is consequently rotated and in doing so causes the operation of pivoted member 238 and the actuation of pivoted lever 241 through link 240. The movement of lever 241 causes one of its arms to move rod 221 to the left, as viewed in Fig. 15, to effect the disengagement of the disc 222 from the pointer 218 against the action of spring 226. Inasmuch as the pointer 218 during the totalization operation is rotated forwardly against the tension of spring 235 it will when the driving connection between the gear 217 and the pointer 218 is broken be returned to its normal or line beginning position. Also, upon the operation of pivoted member 238 the holding pawl 293 of the ratchet sector 286 is disengaged therefrom, and the sector together with the pointers 278 and 279 are returned to their normal position by the action of the spring provided for that purpose. As the cam 236 continues its rotation, pin 255 engages arm 256 and insures the restoration of the pawl 248 in the path of stop lug 249, and insures the disengagement of the driven portion of the clutch 237 from the driving portion thereof and the arresting of cam 236.

The elevator key is, of course, a function key and due to the notches in the underside of its lever, the bars of the selecting unit 38 will be operated to select rod 158 and consequently the counting mechanism will be operated as described for the other function key operations. However, a perforation is made in the tape, the effect of which, on the linecasting machine, is to initiate the operation of the elevator mechanism and thus cause the loaded assembly elevator to be raised to the line delivering position, whereby the assembled line of composed matrices and spacebands will be delivered to the casting position, as is well known in the art to which the present invention pertains.

*Modification*

In Fig. 22 is illustrated an alternative arrangement for moving arm 75 of the perforating mechanism out of operative engagement with cam 78. The construction here shown is conducive to speedier operation, since the operator need only swing the vertically extending thumb portion of lever 355 to the right or left instead of operating handle 87 by a twist of the wrist. Lever 355 is pivoted at 356 and is a part of a toggle comprising also link 357 connecting lever 355 with a lever 358 fixedly pivoted at 359. The pivotal connection between lever 355 and link 357 comprises a pilot screw 360 the extended or stud portion of which operates in a hole 361 to define the limits of movement of the toggle. Lever 358 is provided with a rightwardly extending arm to which is pivotally carried the perforator operating arm 75. When the toggle assumes the extended position shown in solid lines in Fig. 22, the arm 75 is operated vertically into engagement with cam 78 and when the toggle assumes its dotted line position arm 75 is lowered and thus removed from operative engagement with cam 78, which operation is analogous to that described in connection with the construction shown in Fig. 12.

Although the present invention has been disclosed and described with reference to a linecasting machine it is, of course, understood that the invention is capable of embodiment in many and widely varied forms other than that specifically disclosed without departing from the spirit and scope of the present invention.

What is claimed is:

1. In a keyboard device, a plurality of keys, a constantly rotating shaft, a perforating device, a counting device, a cam carried by said shaft to perform the perforating operation, a pair of cams carried by said shaft to initiate and control the counting operation, means controlled by said keys to effectuate through the instrumentality of said cams the operativeness of said devices, and means comprising a double trip-off latch to define the limits of operation of said devices.

2. In a keyboard device, a plurality of keys, a constantly rotating shaft, a perforating mechanism comprising an intermittently rotatable element, a counting mechanism comprising an incrementally movable element, means controlled by said keys to connect both of said elements to said shaft, and means comprising a double trip-off latch to determine the cyclical operation of said first mentioned means.

3. In a keyboard device, a series of keys, a first mechanism operable under certain operating conditions, a second mechanism operable under other operating conditions, a constantly rotating shaft, means controlled by said keys to connect both of said mechanisms to said shaft, and means comprising a double trip-off latch to define the cyclical operation of said mechanisms.

4. In a keyboard device, a series of keys, a first mechanism operable under certain operating conditions, a second mechanism operable under other operating conditions, a constantly rotating shaft, means controlled by said keys to connect both said mechanisms to said shaft, and means comprising a double trip-off latch to define the limits of operation of said mechanisms.

5. In a keyboard device, a series of keys, mechanism operable under certain operating conditions, another mechanism operable under other operating conditions, a constantly rotating shaft, means controlled by said keys to connect both said mechanisms to said shaft, and means comprising a double trip-off latch to define the limits of operation of said mechanisms, each of said keys effective for initiating through the instrumentality of said latch solely a single cycle of said operation for each effectiveness thereof.

6. In a keyboard perforator, a counting device, a scale, an index hand, a series of keys, means to move said index hand with respect to said scale in accordance with the operation of said counting device as determined by the key operated, solely mechanical means invariably controlled by one of said keys to control the return of said index hand to its normal position, and means effective independently of the length of key actuation to insure a single cyclic operation of said mechanical means.

7. In a keyboard device, a plurality of keys, a shaft, a scale, an indicator for said scale, motive means constantly tending to rotate said shaft, means invariably controlled by said keys to render said shaft operable intermittently, means to transfer the movement of said shaft to said indicator, a special key, and solely mechanical means to render said last mentioned means ineffective upon the operation of said special key.

8. In a keyboard device, a plurality of keys, a scale, an indicator for said scale, a shaft, motive means constantly tending to rotate said shaft, a constantly rotating shaft, elements operatively carried by said constantly rotating shaft, means invariably controlled by said keys to connect said elements to said constantly rotating shaft to render said other shaft operable intermittently, means to transfer the movement of said intermittently operable shaft to said indicator, a special key, and solely mechanical means to render said last mentioned means ineffective upon the operation of said special key.

9. In a keyboard apparatus, a plurality of devices operable under different operating conditions, a shaft, operating elements mounted on said shaft, a series of keys, said devices operated differently upon the operation of each key, means to connect said elements to said shaft to effectuate the operation of said devices in accordance with the key depressed, and automatic means comprising a double trip-off latch to control said means to insure the effectuation of said operations in single cycles.

10. In a keyboard apparatus, a plurality of sets of selectable elements, keylevers for operating said elements in different permutations, signal controlling means operated by one of the sets of elements, a counting mechanism controlled by the other set of elements including a series of members actuated pemutably, and element selected for each actuation of the members, a counter, and means responsive to each operation of a keylever and cooperating with said selected element for determining the extent of operation of the counter, an indicator dial, an index hand, said index hand operable variably relative to said dial to correspond with the operation of said counter, a special key, a pair of pointers, and means controlled by said special key to move said pointers proportionally each time said special key is depressed, and the relative actuation of said index hand and said pointers indicating at all times the justifiability of the line being composed.

11. In a keyboard apparatus, a perforating device, a counting device, a plurality of keys, solely mechanical means initiated by each operation of said keys to effect the operation of said devices, and cyclically operable means comprising a double trip-off latch for effecting invariably the single operation of said devices upon each effectiveness thereof.

12. In combination with a keyboard apparatus suitable for the production of perforated tape representing lines of composition, a series of keys, a perforating device, a counting device, solely mechanical means initiated by each operation of said keys to effect the operation of said devices, and means comprising a double trip-off latch to control the cyclic operation of said means.

13. In combination with a keyboard perforator suitable for the production of perforated tape representing lines of composition, a scale, a pointer, a code disc selector means including an incrementally operable member for controlling the movement of said pointer variably with respect to said scale to indicate the cumulative widths of characters, a pair of pointers, and differential gearing operable from a common source of power for rotating said pair of pointers different distances for each effectiveness thereof for indicating a different condition.

14. In a keyboard apparatus, a series of keys, a perforating device, a counting device, permutation code mechanism adapted to variably control said devices, said mechanism comprising an element invariably operated by said keys to initiate the operation of said devices, and means comprising a double trip-off latch to control the cylic operation of said devices.

15. In a keyboard apparatus, an indicating device including a scale, an index hand, a counting device comprising a plurality of circumferentially arranged slidable members adapted to coact with a series of centripetally biased elements, means to control the operation of said device incrementally through the cooperation of said members and said elements to actuate correspondingly said index hand with respect to said scale, and solely mechanical means to render said counting device ineffective to actuate said index hand to control the return of said index hand to its normal position.

16. In a keyboard perforator, suitable for the production of perforated tape representing lines of composition, a plurality of keys, a counting device, means to operate said device incrementally according to the keys depressed, an indicator dial, an index hand, said index hand operable variably with respect to said dial to correspond with the operation of said device, a special key, a pair of pointers, means adapted to be reciprocated invariably upon the actuation of each of said keys, and means carried by said reciprocable means and operable upon the actuation of said special key to move said pointers proportionally, the relative actuation of said index hand and said pointers indicating at all times the justifiability of the line being composed.

17. In combination with a keyboard perforator suitable for the production of perforated tape representing lines of composition, a series of keys, a scale, a pointer movable variably with respect to said scale to indicate a condition representing the cumulative widths of characters, a pair of pointers, a special key, means adapted to be reciprocated invariably upon the actuation of said keys, supplemental means carried by said means and rendered operative by said special key, and differential gearing operable by said supplemental means for rotating said pair of pointers different amounts for each effectiveness thereof for indicating a different condition.

18. In combination with a keyboard perforator suitable for the production of perforated tape representing lines of composition, a series of keys, a scale, a pointer movable variably with respect to said scale to indicate a condition representing the cumulative widths of characters, a pair of pointers, a special key, means adapted to be reciprocated invariably upon the actuation of said keys, supplemental means carried by said means and rendered operative by said special key, differential gearing operable by said supplemental means for rotating said pair of pointers different amounts for each effectiveness thereof for indicating a different condition, and signal means controlled by the joint action of all of said pointers.

19. In a keyboard device, an indicating device including a scale, an index hand, a counting device comprising a plurality of circumferentially arranged slidable elements adapted to coact with a series of radially operable elements, means to control the operation of said device incrementally through the cooperation of said elements to actuate correspondingly said index hand with respect to said scale, resilient means operatively associated with said index hand, motive means including a single revolution clutch, and solely mechanical means cooperatively associated with said motive means and said resilient means and operable upon each initiation of said clutch to render said counting device ineffective to actuate said index hand to control the return of said index hand to its normal position.

20. In combination with a keyboard perforator suitable for the production of perforated tape representative of consecutive characters and word spacers, a series of keys, a scale, a pointer movable variably with respect to said scale in response to the operation of said keys to indicate the cumulative widths of characters, a pair of pointers, means for operating said pointers differentially to indicate the cumulative expansibility of the word spacers, a special key, means reciprocated invariably upon the operation of said keys, supplemental means carried by said means, said special key when actuated adapted to render said supplemental means operative to effect a relative change in said pointers to correspond to the increment of expansibility provided by a spacer.

21. In an apparatus for preparing a record to be used to control line composing machines, a series of keys, a first mechanism operable under certain operating conditions, a second mechanism operable under other operating conditions, operating means common to said mechanisms, a constantly rotating shaft, means controlled by said keys to associate said common operating means to said shaft, and means comprising a double trip-off latch to define the cyclical operation of said mechanisms.

22. In an apparatus for preparing a record to be used to control line composing machines, an indicating device including a scale, an index hand, a counting device comprising a plurality of circumferentially arranged slidable elements coacting with a series of radially operable elements, means to control the operation of said device incrementally through the cooperation of said elements to actuate correspondingly said index hand with respect to said scale, resilient means operatively associated with said index hand, a pair of pointers, a special key, means reciprocated invariably upon the actuation of said keys, supplemental means carried by said reciprocating means and rendered operative by said special key, differential gearing operable through said supplemental means for rotating said pair of pointers different amounts for each effectiveness thereof for indicating a different condition, motive means including a single revolution clutch, and solely mechanical means cooperatively associated with said motive means, resilient means and reciprocating means and operable upon each initiation of said clutch to render said counting device and said special key ineffective to actuate said index hand and said pair of pointers, respectively, to control the return of said index hand and said pair of pointers to their normal position.

23. In an apparatus for preparing a record to be used to control line composing machines, a series of keys, a first mechanism operable under certain operating conditions, a second mechanism operable under other operating conditions, a constantly rotating shaft, means including a spring-biased bell crank lever responsive to the operation of said keys for connecting both of said mechanisms to said shaft, and a pair of latches severally coactive with said bell crank lever to effect invariably a single cycle of operation of said mechanisms.

24. In an apparatus for preparing a record to be used to control line composing machines, a series of keys, a perforating device, a counting device, a constantly rotating shaft, means controlled by said keys to associate both of said devices operatively with said shaft, said means including a pair of pivoted members arranged with oppositely disposed stepped surfaces, means effective normally to bias said members into contactual engagement whereby said surfaces are presented in offset relation to each other, a latch element positioned between said members, and normally coacting with one of said members, and to escape the other of said members, and means to render said element cooperative with either of said members to determine the cyclic operation of said devices.

25. In an apparatus for preparing a record to be used to control line composing machines, a series of keys, a plurality of devices, a constantly rotating shaft, and means controlled by said keys to associate said devices operatively with said shaft, including a pair of pivoted members arranged with oppositely disposed irregular surfaces, and a latch element positioned between said members and cooperating with the irregular surfaces thereof to hold initially said means ineffective and subsequently if any of said keys are held operated.

26. In an apparatus for preparing a record to be used to control line composing machines, a series of keys, a plurality of devices, a constantly rotating shaft, means including a first component and a second component controlled by said keys to associate said devices operatively with said shaft, latch means normally coactive with said first component and non-coactive with said second component, and means to render said latch means coactive with either component to determine the cyclic operation of said devices.

27. In an apparatus for preparing control strips for linecasting machines, a constantly rotating shaft, a symbol producing mechanism comprising solely mechanical instrumentalities, a counting mechanism comprising a uni-directional counting organ, means to connect said instrumentalities and said organ to said shaft, and means to determine the cyclical operation of said first mentioned means.

MAURUS T. GOETZ.
ALBERT H. REIBER.